(12) United States Patent
Ikram et al.

(10) Patent No.: US 11,762,071 B2
(45) Date of Patent: Sep. 19, 2023

(54) MULTI-MODE MULTI-SENSOR CALIBRATION

(71) Applicant: TEXAS INSTRUMENTS INCORPORATED, Dallas, TX (US)

(72) Inventors: Muhammad Zubair Ikram, Richardson, TX (US); Do-Kyoung Kwon, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 864 days.

(21) Appl. No.: 16/689,647

(22) Filed: Nov. 20, 2019

(65) Prior Publication Data

US 2020/0158840 A1    May 21, 2020

Related U.S. Application Data

(60) Provisional application No. 62/770,427, filed on Nov. 21, 2018.

(51) Int. Cl.
| | | |
|---|---|---|
| *G01S 7/497* | (2006.01) |
| *G01S 7/40* | (2006.01) |
| *G01S 13/931* | (2020.01) |
| *G06T 7/90* | (2017.01) |
| *G06T 7/70* | (2017.01) |
| *G06T 7/80* | (2017.01) |
| *G01S 17/931* | (2020.01) |

(52) U.S. Cl.
CPC ............... *G01S 7/497* (2013.01); *G01S 7/40* (2013.01); *G01S 13/931* (2013.01); *G01S 17/931* (2020.01); *G06T 7/70* (2017.01); *G06T 7/80* (2017.01); *G06T 7/90* (2017.01)

(58) Field of Classification Search
CPC ........ G01S 17/86; G01S 17/89; G01S 7/4972; G01S 17/931; G01S 13/867; G01S 13/865; G01S 13/931; G01S 13/862; G01S 2013/93275; G01S 2013/93274; G01S 2013/93273; G01S 2013/93272; G01S 2013/93271; G01S 7/497; G01S 7/4091; G01S 7/4808; G01S 13/89; G06T 7/80

See application file for complete search history.

(56) References Cited

U.S. PATENT DOCUMENTS

| 9,823,116 B2 * | 11/2017 | Silny | G01J 1/4228 |
| 10,043,289 B1 * | 8/2018 | Rao | G06T 7/80 |
| 10,438,081 B2 | 10/2019 | Kwon et al. |

(Continued)

*Primary Examiner* — Olumide Ajibade Akonai
(74) *Attorney, Agent, or Firm* — Michael T. Gabrik; Frank D. Cimino (57) ABSTRACT

A method for multi-sensor calibration includes imaging a calibration target with a first sensor using a first modality to obtain a first set of data and a second sensor using a second modality that is different from the first modality to obtain a second set of data. A border of the calibration target is identified based on the first set of data. A first centroid location of the calibration target is identified based on the border of the calibration target. A border of a pattern disposed on the calibration target is identified based on the second set of data. A second centroid location of the calibration target is identified based on the border of the pattern. Calibration data for the first sensor and the second sensor is generated based on the first centroid location and the second centroid location.

11 Claims, 11 Drawing Sheets

(56) References Cited

U.S. PATENT DOCUMENTS

| | | | |
|---|---|---|---|
| 2010/0157280 A1* | 6/2010 | Kusevic | G01S 7/4972 356/4.01 |
| 2014/0132723 A1* | 5/2014 | More | G01S 7/497 348/46 |
| 2016/0116573 A1* | 4/2016 | Appia | G01S 13/867 342/52 |
| 2019/0187258 A1* | 6/2019 | Sebastian | G01S 17/86 |
| 2020/0005489 A1* | 1/2020 | Kroeger | G06T 7/80 |
| 2021/0211547 A1* | 7/2021 | Liu | H04N 1/23 |

\* cited by examiner

MULTI-MODE MULTI-SENSOR CALIBRATION

CROSS-REFERENCE TO RELATED APPLICATIONS

The present application claims priority to U.S. Provisional Patent Application No. 62/770,427, filed Nov. 21, 2018, entitled "Multi-Mode Multi-Sensor Calibration," which is hereby incorporated herein by reference in its entirety.

BACKGROUND

Advanced driver assistance systems (ADAS) are included in automobiles and other vehicles to improve safety by reducing human operation error. These systems are enabled by sensors, such as radar sensors, LiDAR sensors, cameras, etc. In an automotive sensor system, one or more sensors may be used to detect obstacles around the vehicle and the speeds of the detected objects relative to the vehicle. A processing unit in or coupled to the sensor system may determine the appropriate action needed, e.g., to avoid a collision or to reduce collateral damage, based on signals generated by the sensors. Automotive sensor systems are capable of detecting objects and obstacles around a vehicle, the position of any detected objects and obstacles relative to the vehicle, and the speed of any detected objects and obstacles relative to the vehicle. Via the processing unit, the sensor system may, for example, alert the vehicle driver about potential danger, prevent a collision by controlling the vehicle in a dangerous situation, take over partial or complete control of the vehicle, assist the driver with parking the vehicle, and/or perform other automotive control functions.

SUMMARY

A method and apparatus for concurrently calibrating multiple sensors of different types are disclosed herein. In one example, a multi-sensor calibration target includes a first panel and a second panel. The first panel has a first geometric shape. The second panel is disposed on a first surface of the first panel, and has a second geometric shape such that the first panel extends beyond the second panel. The second panel includes a border portion of a first color, and an inner portion of a second color that is different from the first color. A corner of the inner portion of the second panel is disposed at a predetermined distance from a centroid of the first panel.

In another example, a method for multi-sensor calibration includes imaging a calibration target with a first sensor using a first modality to obtain a first set of data and a second sensor using a second modality that is different from the first modality to obtain a second set of data. A border of the calibration target is identified based on the first set of data. A first centroid location of the calibration target is identified based on the border of the calibration target. A border of a pattern disposed on the calibration target is identified based on the second set of data. A second centroid location of the calibration target is identified based on the border of the pattern. Calibration data for the first sensor and the second sensor is generated based on the first centroid location and the second centroid location.

In a further example, a non-transitory computer-readable medium encoded with instructions that when executed cause a processor to identify a first centroid location of a multi-sensor calibration target based on a first image of the multi-sensor calibration target obtained by a first sensor, identify a second centroid location of the multi-sensor calibration target based on a second image of the multi-sensor calibration target obtained by a second sensor, and identify a third centroid location of the multi-sensor calibration target based on a third image of the multi-sensor calibration target obtained by a third sensor. The instructions also cause the processor to generate calibration data for the first sensor, the second sensor, and the third sensor based on the first centroid location, the second centroid location, and the third centroid location.

BRIEF DESCRIPTION OF THE DRAWINGS

For a detailed description of various examples, reference will now be made to the accompanying drawings in which.

DETAILED DESCRIPTION

In this description, the term "couple" or "couples" means either an indirect or direct wired or wireless connection. Thus, if a first device couples to a second device, that connection may be through a direct connection or through an indirect connection via other devices and connections. Also, in this description, the recitation "based on" means "based at least in part on." Therefore, if X is based on Y, then X may be a function of Y and any number of other factors.

In vehicular applications, sensors are mounted at various location on a vehicle and in various orientations. Each sensor detects and locates objects in its own, respective coordinate system. Detected objects are visualized in a world (e.g., east-north-up) coordinate system, and a map is aligned, for example, with a starting location of an inertial measurement unit (IMU). The location and orientation of each sensor's coordinate system should be known with respect to the IMU (aligned with the vehicle coordinates). The coordinate system transformation for each sensor (for transformation to the coordinate system of a different sensor) may be represented by a 3×3 rotation matrix and a 3×1 translation vector, expressed in combination as $M_{es}$, where e represents ego vehicle (i.e., the vehicle that includes the sensors) and s represents a sensor (e.g., radar, LiDAR, or camera). Determination of $M_{es}$ (e.g., $M_{eR}$, $M_{eL}$, or $M_{eC}$) and its application in sensor data processing and object visualization is referred to as calibration.

Figure 1:
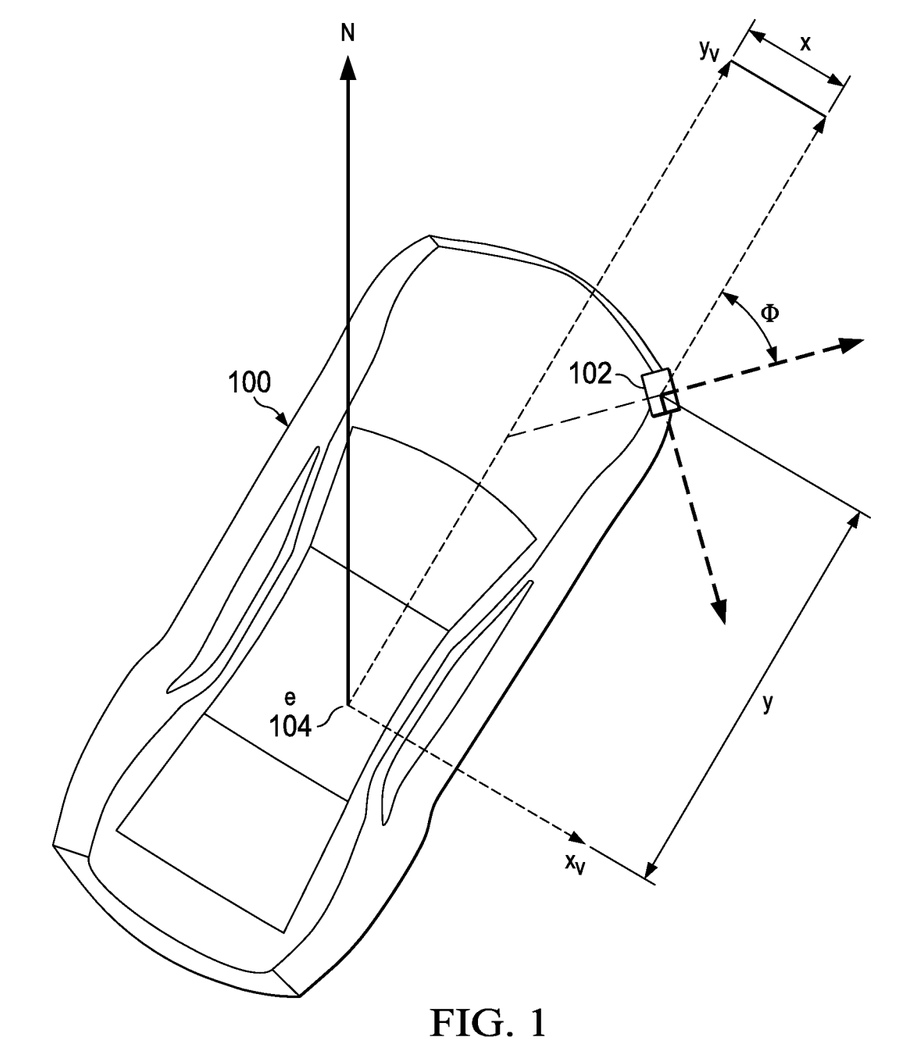
FIG. 1 shows an example of sensor calibration.

FIG. 1 shows an example of sensor calibration. In FIG. 1, a vehicle 100 includes a radar sensor 102. Calibration includes determination of translation and rotation. Determination of translation (x, y, z) includes determination of the position of the radar sensor 102 with respect to the IMU 104. In some calibration methods, translation is determined using manual measurements. Determination of rotation (ϕ) includes determination of the mount angle of the radar sensor 102 with respect to the vehicle heading direction. In some calibration methods, rotation is determined manually using object triangulation or semi-automatically using occupancy grid maps.

The calibration apparatus and method disclosed herein provide concurrent calibration of three sensors: a radar sensor, an optical sensor (a camera), and a LiDAR sensor. Joint calibration of the three sensors is difficult because each of the sensors detects and locates an object differently. For example, the radar sensor is best at detecting metallic objects, the LiDAR sensor determines the shape of an object, and the camera can best detect features of an object. In many examples of the multi-sensor calibration method disclosed herein, the three sensors view a same calibration target. The calibration target includes features that enable imaging by and calibration of all three sensors. The calibration target may be imaged at multiple different locations. The data provided by the three sensors is processed (e.g., using non-linear least-squares optimization) to generate the calibration matrices applied to calibrate the sensors.

Figure 2:
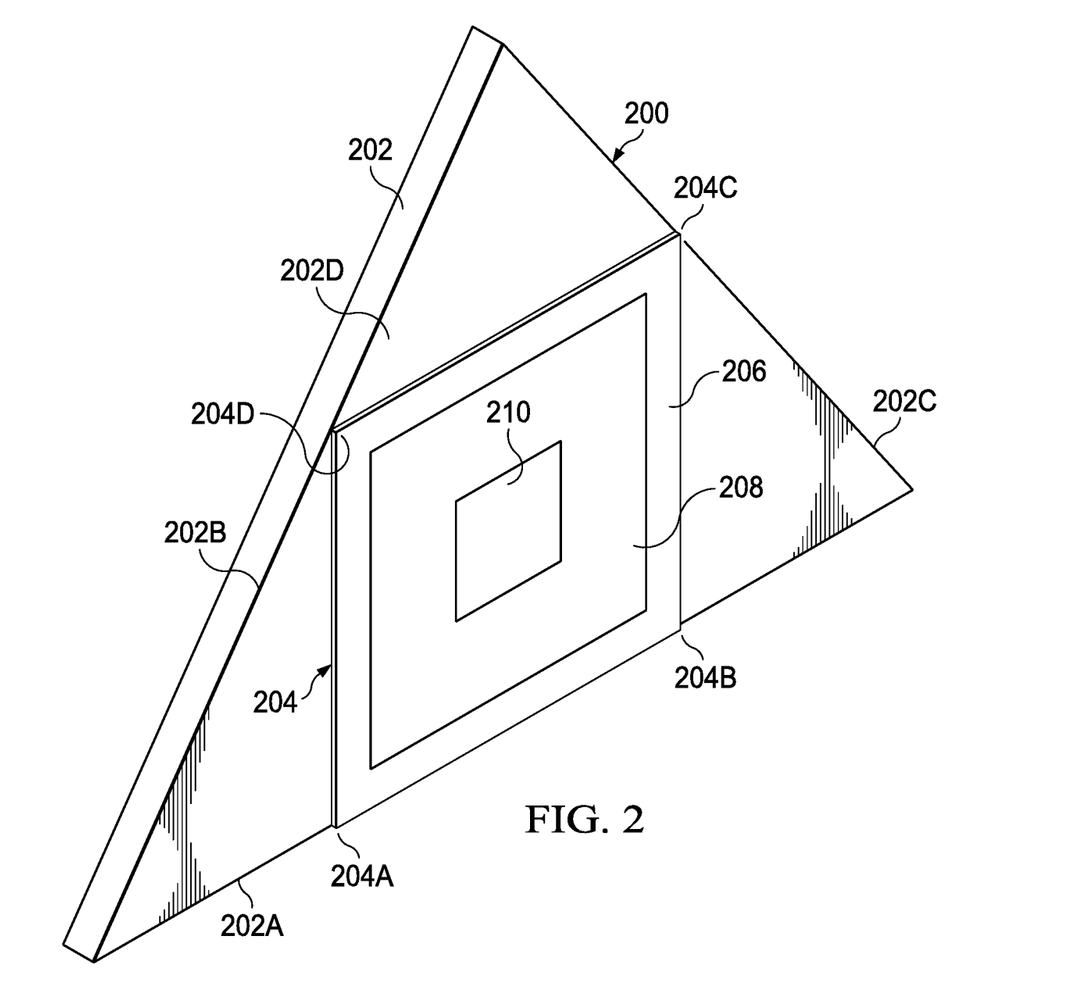
FIG. 2 shows a view of a front side of an example calibration target suitable for concurrent calibration of LiDAR, radar, and optical sensors in accordance this description.

FIG. 2 shows a view of a front side of an example calibration target 200 suitable for concurrent calibration of a heterogeneous group of sensors, such as LiDAR, radar, and optical sensors, in accordance with this description. The calibration target 200 includes a first panel 202 having a geometric shape, such as a triangular prism having edge 202A, edge 202B, and edge 202C, and front side 202D. A second panel 204 having a geometric shape different from that of the first panel 202, such as a rectangular pattern (e.g., a square) is disposed on the front side 202D of the first panel 202. The second panel 204 includes a border portion 206 of a first color (e.g., white), and includes, within the border portion 206, an inner portion 208 of a second color (e.g., black). The second panel 204 may also include a central portion 210 of the first color disposed within (e.g., centered at a centroid of the first panel 202) the inner portion 208. In some implementations of the calibration target 200, a corner 204A and a corner 204B of the second panel 204 are disposed on edge 202A of the first panel 202. A corner 204C of the second panel 204 is disposed on the edge 202C of the first panel 202. A corner 204D of the second panel 204 is disposed on the edge 202B of the first panel 202.

The example target 200 includes a number of features that may be used by the various types of sensors to detect the position and orientation of the target 200. For example, a LiDAR sensor may detect the outline of the first panel 202, and based on the outline the centroid of the first panel 202 can be identified. An optical sensor (e.g., a camera) may detect the second panel 204, and based on the corners of the inner portion 208, the centroid of the first panel 202 can be identified.

Figure 3:
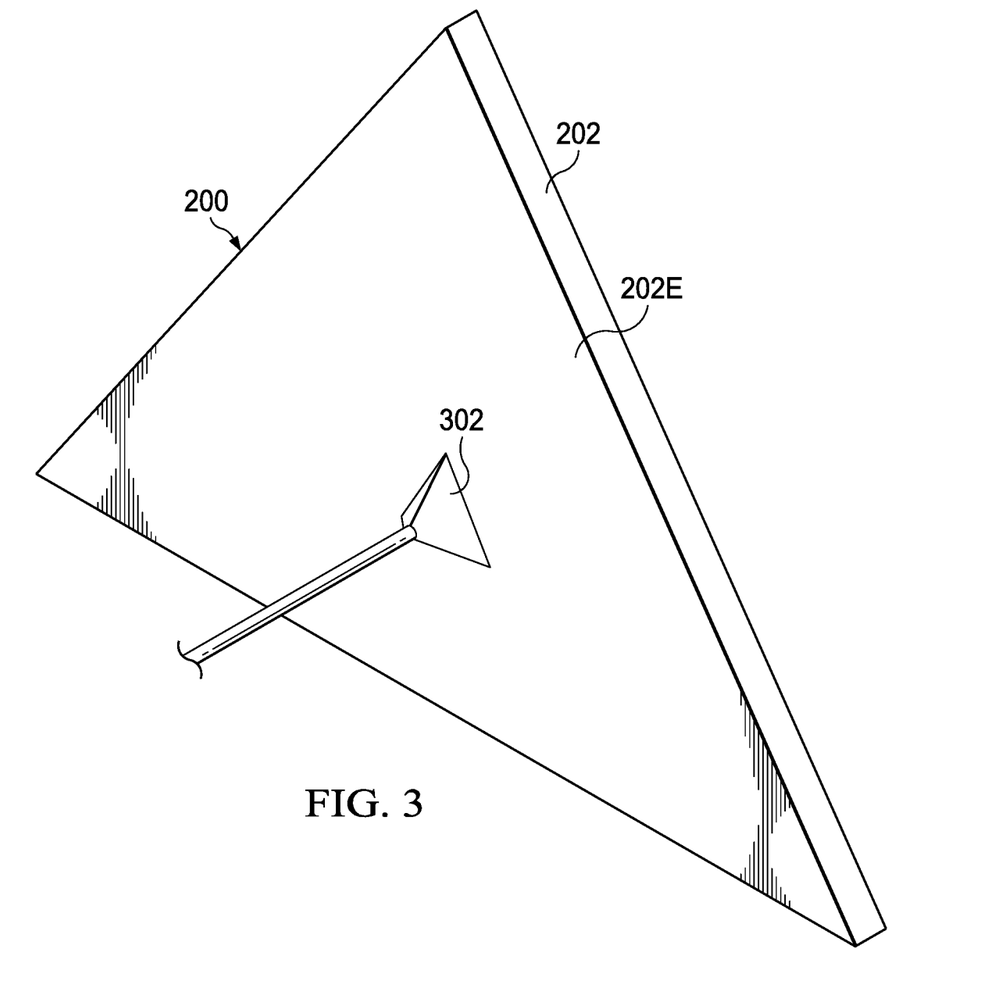
FIG. 3 shows a view of a back side of the calibration target of FIG. 2.

FIG. 3 shows a view of a back side 202E of the calibration target 200. A corner reflector 302 is disposed on the back side 202E, e.g., at the centroid of the first panel 202. A radar sensor may detect the corner reflector 302 because the first panel 202 and the second panel 204 are non-metallic or generally not radar reflective (e.g., made of wood). Thus, the calibration target 200 includes features that allow a LiDAR sensor, a camera, and a radar sensor to identify the centroid of the calibration target 200 based on concurrently acquired images of the calibration target 200.

The calibration target 200 may be mounted on a tripod or other structure that allows the calibration target 200 to be positioned and repositioned for imaging by and calibration of the LiDAR sensor, radar sensor, and camera.

Figure 4:
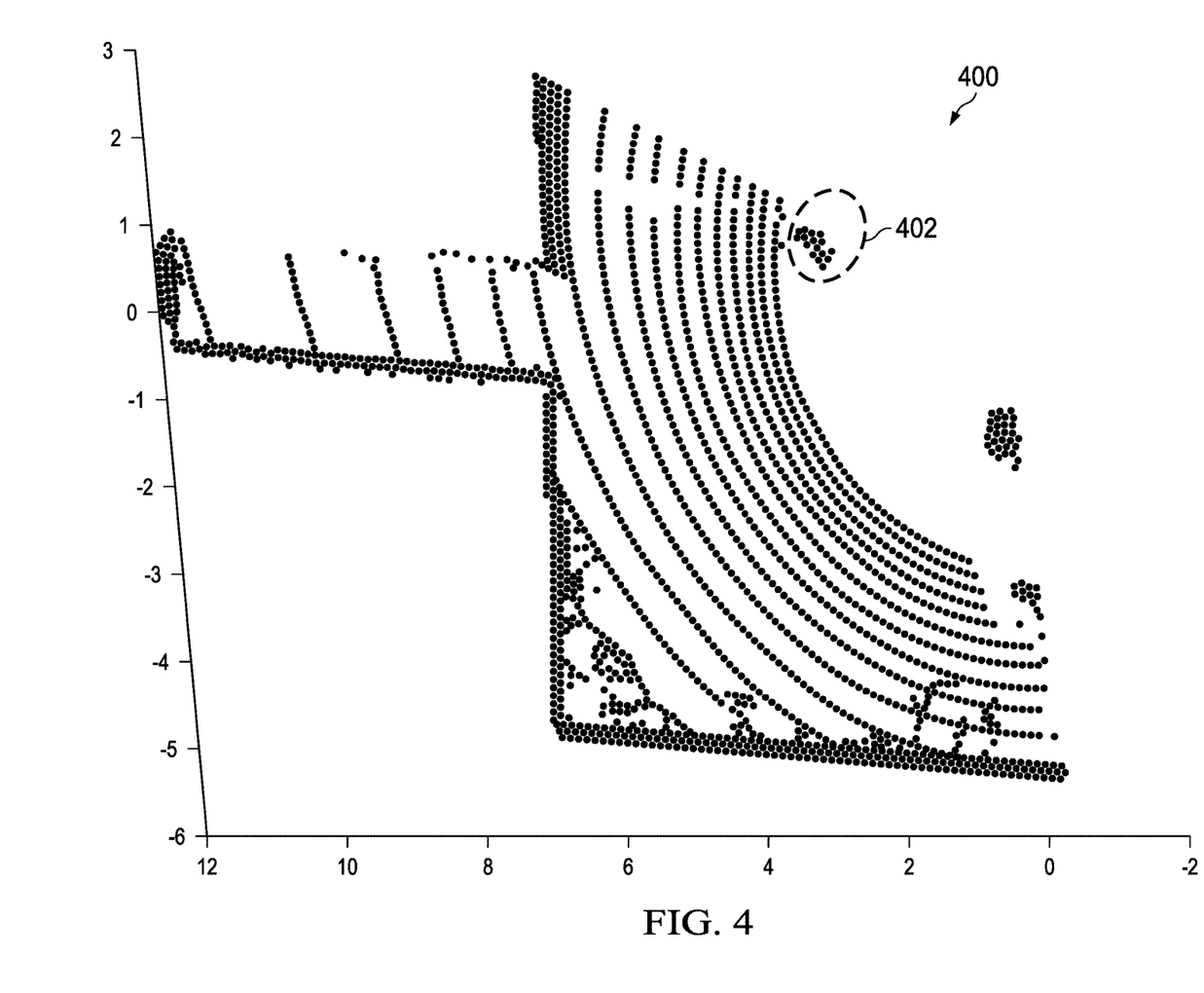
FIG. 4 shows an example 3D point cloud imaging the calibration target of FIG. 2 by a LiDAR sensor.

FIG. 4 shows an example 3D point cloud 400 produced by imaging the calibration target 200 with a LiDAR sensor. In the 3D point cloud 400, the calibration target 200 is imaged in area 402.

Figure 5:
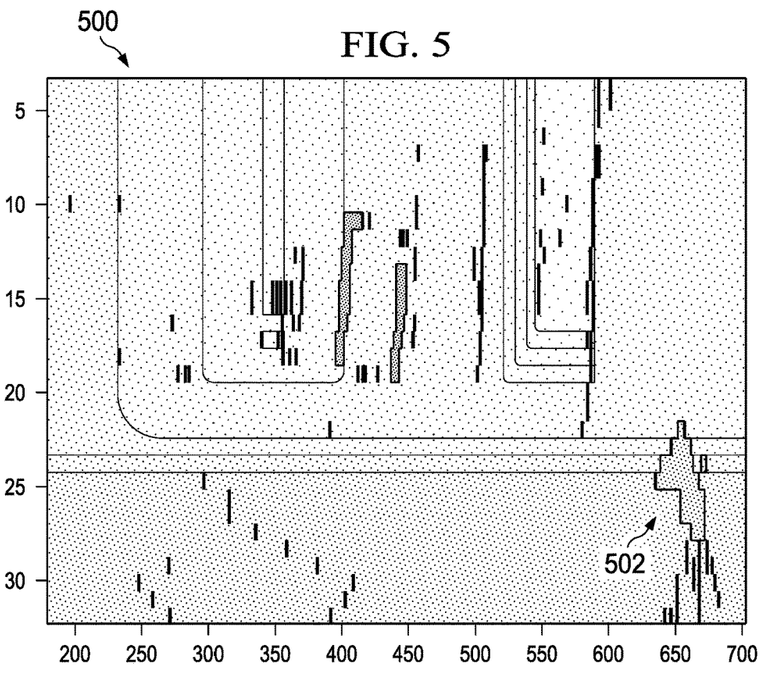
FIG. 5 shows an example slice of the 3D point cloud of FIG. 4 including the calibration target of FIG. 2.

FIG. 5 shows an example slice 500 of the 3D point cloud 400. In the slice 500, the calibration target 200 is shown in area 502.

Figure 6:
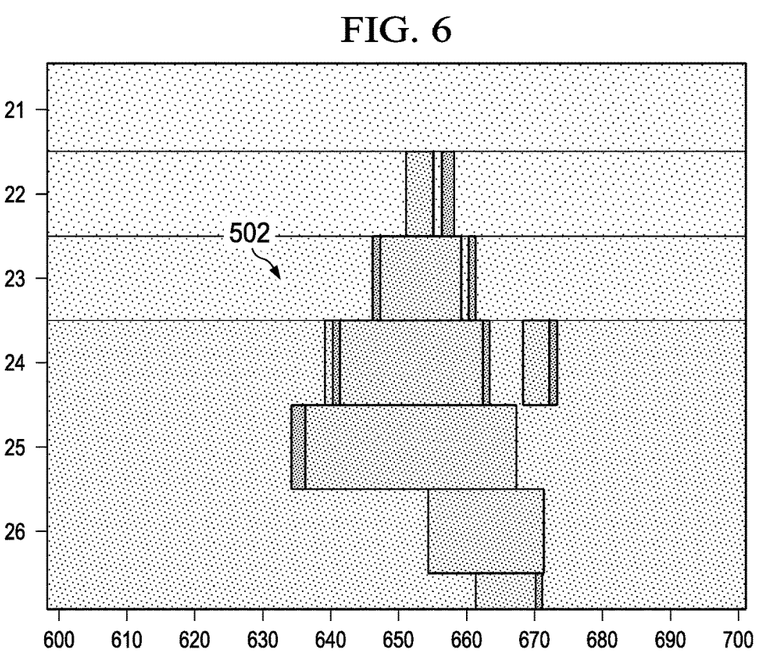
FIG. 6 shows the calibration target of FIG. 2 as imaged in the LiDAR slice of FIG. 5.

FIG. 6 shows a magnified view of the calibration target 200 from the slice 500. Given the dimensions of the first panel 202 and the width of the scan lines of the calibration target 200, a calibration computer can estimate the location of the centroid of the first panel 202.

Figure 7A:
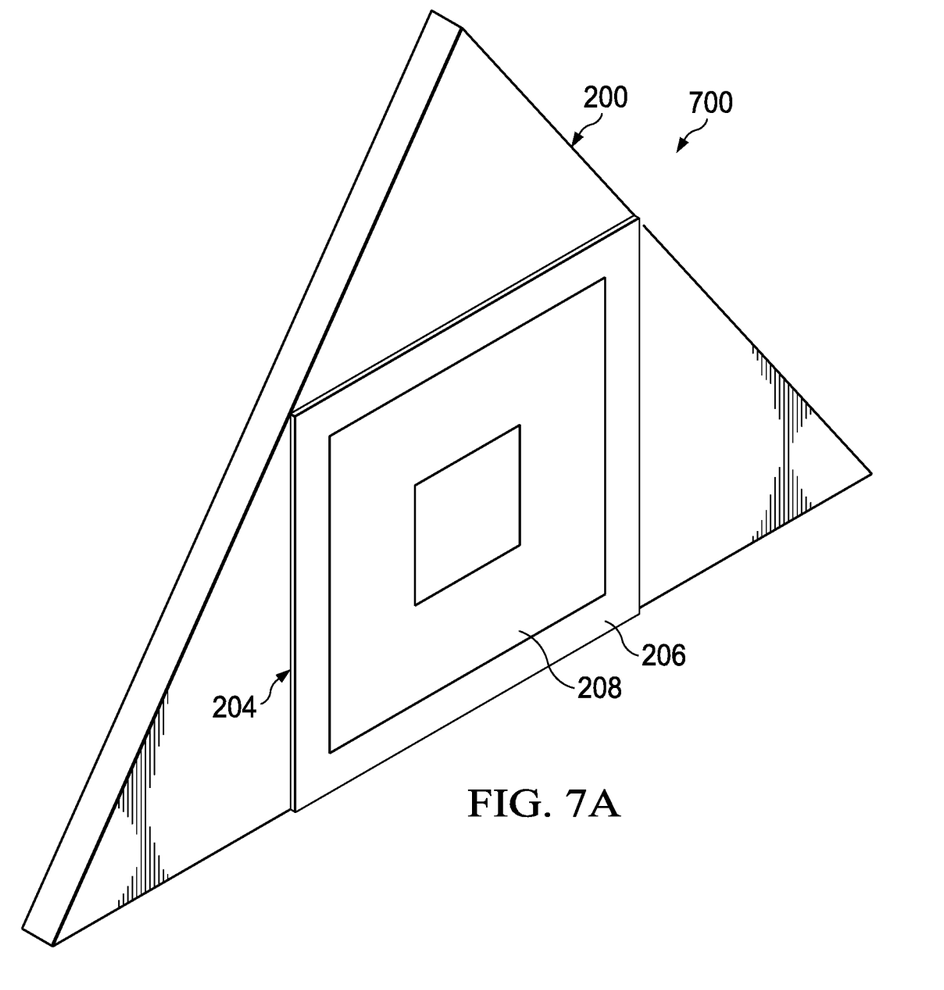
FIG. 7A shows an example camera image of the calibration target of FIG. 2.
Figure 7B:
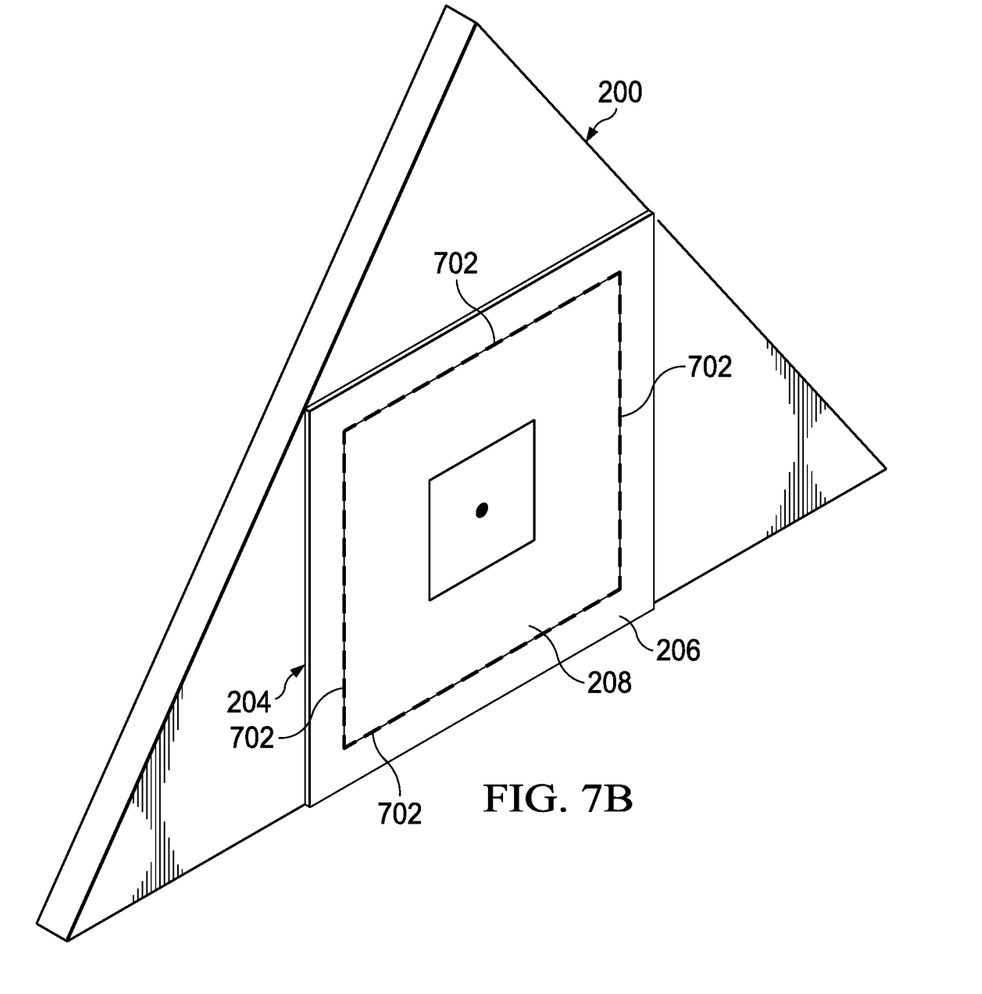
FIG. 7B shows example zero-crossing detection applied to identify edges in the camera image of FIG. 7A.

FIG. 7A shows an example camera image 700 of the calibration target 200. Because of the high contrast between the border portion 206 and the inner portion 208, a calibration computer can identify the edges of the inner portion 208 using zero-crossing detection (e.g., identifying sign change in a Laplacian filtered image). FIG. 7B shows an example of zero-crossing detection applied by a calibration computer to identify the edges 702 of the inner portion 208 in the camera image 700.

Figure 7C:
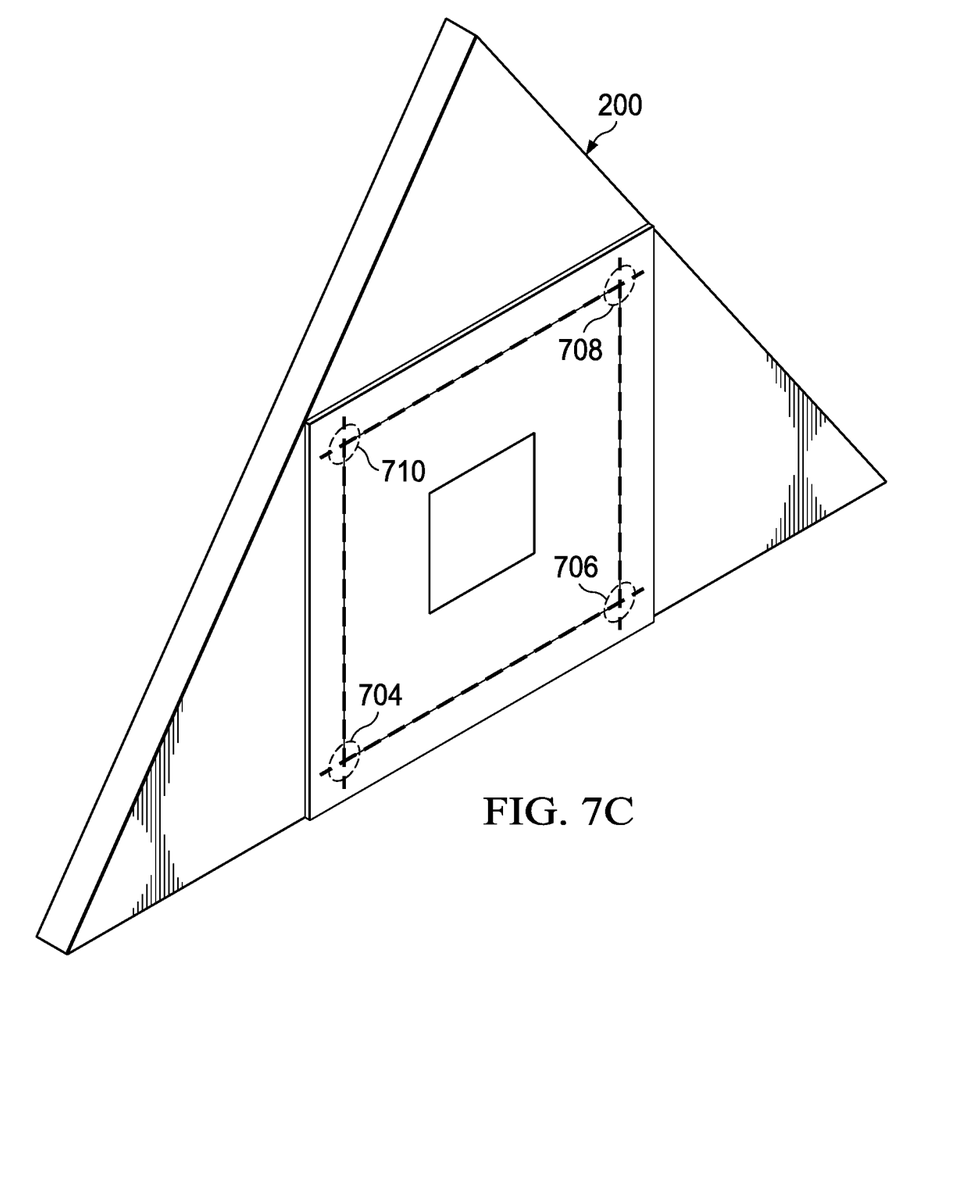
FIG. 7C shows example corner detection applied at intersection of the edges identified in FIG. 7B.

Having identified the edges 702 of the inner portion 208, the calibration computer may fit lines to the edges 702 and identify corners of the inner portion 208 at the intersections of the lines. FIG. 7C shows example corner detection applied to identify corners 704, 706, 708, and 710 at the intersection of the lines fit to the edges 702 detected in FIG. 7B.

Figure 7D:
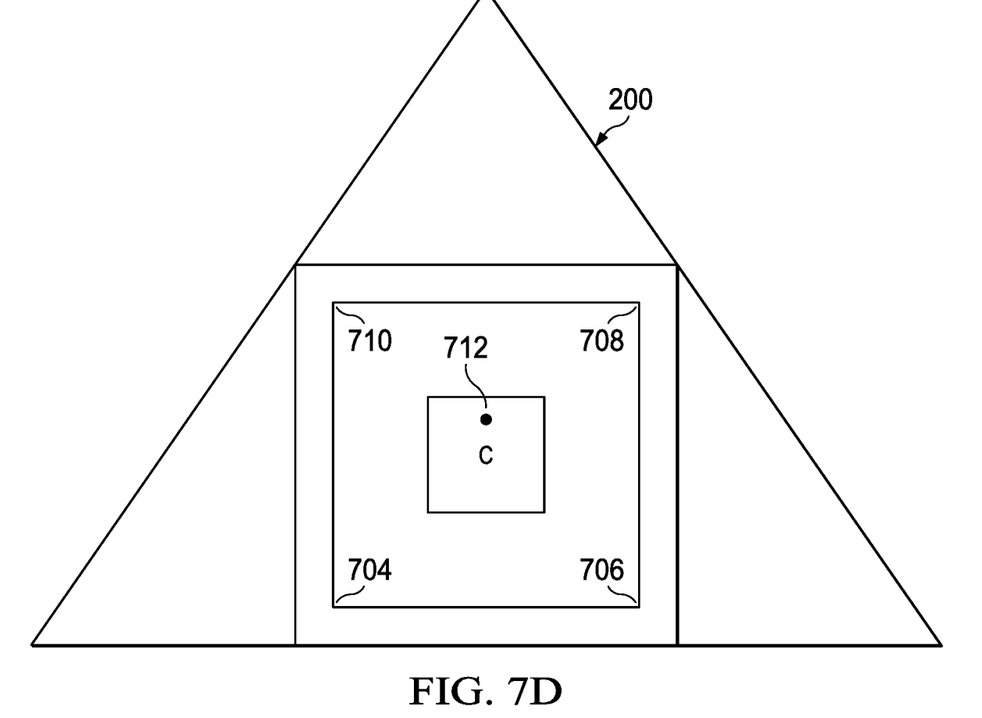
FIG. 7D shows example centroid identification in the camera image based on the corners detected in FIG. 7C.

Based on one or more of the corners 704, 706, 708, and 710 identified FIG. 7D, and given distance from a corner to the centroid of the first panel 202, the calibration computer can determine the location of the centroid 712 of the first panel 202 based on the camera image 700.

Figure 8:
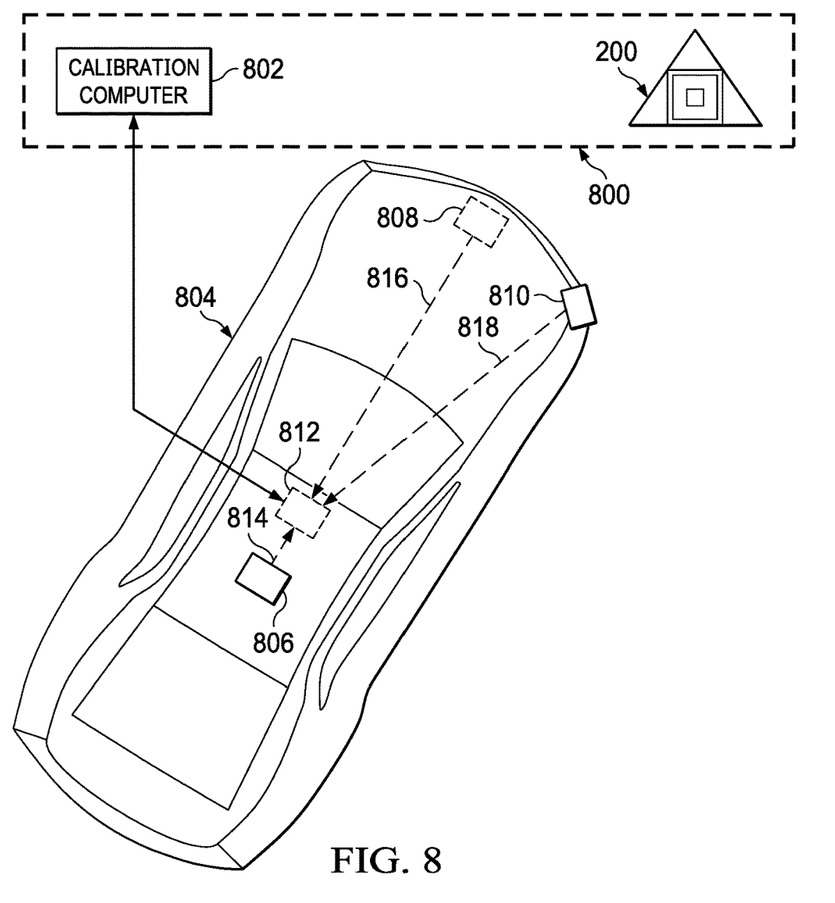
FIG. 8 shows an example multi-sensor calibration system in accordance with this description.

FIG. 8 shows an example multi-sensor calibration system 800 in accordance with this description. The multi-sensor calibration system 800 includes the calibration target 200 and a calibration computer 802. The calibration computer 802 is coupled to a vehicle 804 for concurrent calibration of the LiDAR sensor 806, the camera 808, and the radar sensor 810 of the vehicle 804. The calibration computer 802 includes an in-vehicle computer 812 coupled to the LiDAR sensor 806, the camera 808, and the radar sensor 810. The in-vehicle computer 812 receives image data 814 from the LiDAR sensor 806, image data 816 from the camera 808, and image data 818 from the radar sensor 810. The in-vehicle computer 812 transmits the image data 814, 816, and 818 to the calibration computer 802 for calibration of the LiDAR sensor 806, the camera 808, and the radar sensor 810. The calibration computer 802 processes the image data 814 received from the in-vehicle computer 812 to identify the centroid of the calibration target 200 based on the outline of the calibration target 200, processes the image data 816 received from the in-vehicle computer 812 to identify the centroid of the calibration target 200 based on a corner of the inner portion 208 of the second panel 204, and processes the image data 818 received from the in-vehicle computer 812 to identify the centroid of the calibration target 200 based on a signal-to-noise ratio of the radar signal. The calibration target 200 may be repositioned about the vehicle 804 any number of times, and locations of the centroid of determined for each of the LiDAR sensor 806, the camera 808, and the radar sensor 810 at each location.

The calibration computer 802 computes calibration matrices for each of the LiDAR sensor 806, the camera 808, and the radar sensor 810 by applying non-linear least squares optimization to the locations of the centroid of the calibration target 200 determined based on the LiDAR, radar, and camera images and parameters of the calibration target 200 (e.g., dimensions of the first panel 202 and the second panel 204, and distance from a corner of the inner portion 208 to the centroid).

Figure 9:
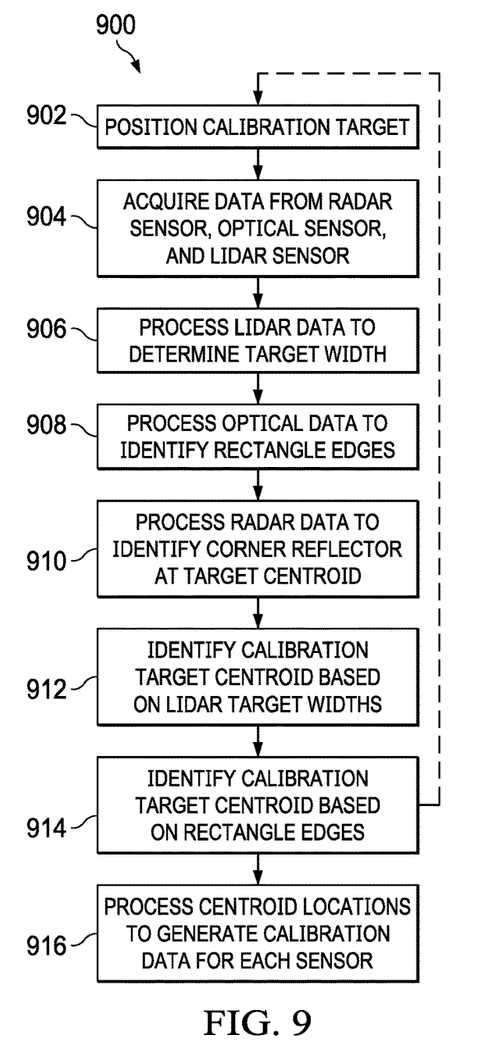
FIG. 9 shows a flow diagram for an example method for calibrating LiDAR, radar, and optical sensors in accordance this description.

FIG. 9 shows a flow diagram for an example method 900 for calibrating LiDAR, radar, and optical sensors in accordance this description. Though depicted sequentially as a matter of convenience, at least some of the actions shown can be performed in a different order and/or performed in parallel. Additionally, some implementations may perform only some of the actions shown.

In block 902, the calibration target 200 is positioned relative to the vehicle 804. The vehicle 804 includes a first sensor (e.g., the LiDAR sensor 806), a second sensor (e.g., the radar sensor 810), and a third sensor (e.g., the camera 808).

In block 904, the first sensor images the calibration target 200 using a first modality to obtain a first set of data, the second sensor images the calibration target 200 using a second modality that is different from the first modality to obtain a second set of data, and the third sensor images the calibration target 200 using a third modality that is different from the first modality and the second modality to obtain a third set of data. More specifically, the LiDAR sensor 806, the radar sensor 810, and the camera 808 acquire images of the calibration target 200, and the image data is transferred from each sensor to the calibration computer 802.

In block 906, a border of the calibration target 200 is identified based on the first set of data. More specifically, the calibration computer 802 processes the LiDAR data received from the LiDAR sensor 806 to determine the widths of the calibration target 200 associated with each scan of the LiDAR sensor 806.

In block 908, a border of the calibration target 200 is identified based on the second set of data. More specifically, the calibration computer 802 processes the optical data received from the camera 808 (e.g., using zero-crossing detection) to identify the edges of the inner portion 208 of the second panel 204.

In block 910, the calibration computer 802 processes the radar data received from the radar sensor 810 to identify the corner reflector 302, and thereby identify the location of the centroid of the first panel 202 with respect to the radar sensor 810.

In block 912, a first centroid location of the calibration target 200 is identified based on the border identified in block 908. More specifically, the calibration computer 802 determines the centroid of the first panel 202 with respect to the LiDAR sensor 806 based on the widths of the calibration target 200 according to the scans of the LiDAR data and the known dimensions of the calibration target 200.

In block 914, a second centroid location of the calibration target 200 is identified based on the border identified in block 908. More specifically, the calibration computer 802 determines the centroid of the first panel 202 with respect to the camera 808 based on one or more corners of the inner portion 208 and a known distance from a corner of the inner portion 208 to the centroid. The calibration computer may identify the corners as points of intersection of lines fit to the edges of the inner portion 208.

The operations of blocks 902-914 may performed any number of times as the calibration target 200 is moved to different locations about the vehicle 804 and centroid location information is computed for the calibration target 200 at the various different locations.

In block 916, calibration data for the first sensor, the second sensor, and the third sensor are generated based on the centroid locations identified in blocks 910, 912, and 914. More specifically, the calibration computer 802 processes the centroid locations determined based on the LiDAR data, the radar data, and the optical data to generate calibration matrices for the LiDAR sensor 806, the radar sensor 810, and the camera 808. Processing of the centroid locations may include non-linear least-squares optimization. For example, a Levenberg-Marquardt algorithm or any of a variety of other non-linear least squares optimization algorithms may be applied to the centroid locations to generate the calibration matrices for transforming from one sensor coordinate system to another.

Figure 10:
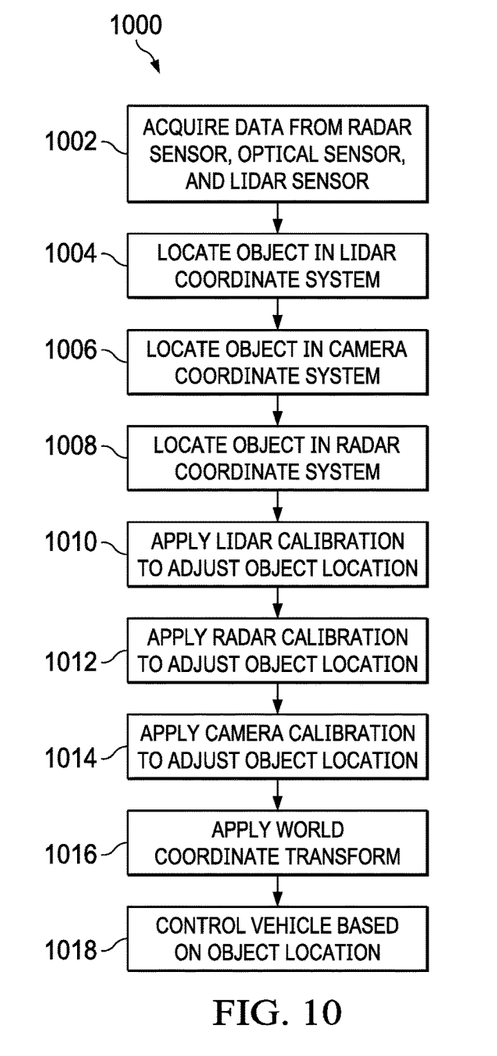
FIG. 10 shows a flow diagram for an example method for applying calibration data generated by the method of FIG. 8 to control a vehicle.

FIG. 10 shows a flow diagram for an example method 1000 for applying calibration data generated by the method 900 to control a vehicle. Though depicted sequentially as a matter of convenience, at least some of the actions shown can be performed in a different order and/or performed in parallel. Additionally, some implementations may perform only some of the actions shown.

In block 1002, the vehicle 804 includes the LiDAR sensor 806, the radar sensor 810, and the camera 808. The LiDAR sensor 806, the radar sensor 810, and the camera 808 acquire LiDAR, radar, and optical images of the environment in which the vehicle 804 is operating.

In block 1004, the LiDAR image data acquired by the LiDAR sensor 806 in block 1002 is processed by the in-vehicle computer 812 and an object is located in the LiDAR coordinate system.

In block 1006, the optical image data acquired by the camera 808 in block 902 is processed by the in-vehicle computer 812 and the object is located in the camera coordinate system.

In block 1008, the radar image data acquired in block 902 is processed by the in-vehicle computer 812 and the object is located in the radar coordinate system.

In block 1010, the in-vehicle computer 812 applies a LiDAR calibration matrix generated using the method 900 to transform the location generated in block 1004 to the vehicle coordinate system.

In block 1012, the in-vehicle computer 812 applies a radar calibration matrix generated using the method 900 to transform the location generated in block 1008 to the vehicle coordinate system.

In block 1014, the in-vehicle computer 812 applies a camera calibration matrix generated using the method 900 to transform the location generated in block 1006 to the vehicle coordinate system.

In block 1016, the in-vehicle computer 812 applies a world coordinate transformation to convert the vehicle coordinate object location generated in blocks 1010, 1012, and 1014 to a world coordinate system.

In block 1018, the in-vehicle computer 812 controls the vehicle based on the world coordinate system object locations generated in block 1016. For example, the in-vehicle computer 812 may control autonomous driving of the vehicle 804, control automated parking of the vehicle 804, control blind spot monitoring in the vehicle 804, control a cruise control of the vehicle 804, or control other automotive system of the vehicle 804 based on the world coordinate system object locations generated in block 1016.

Figure 11:
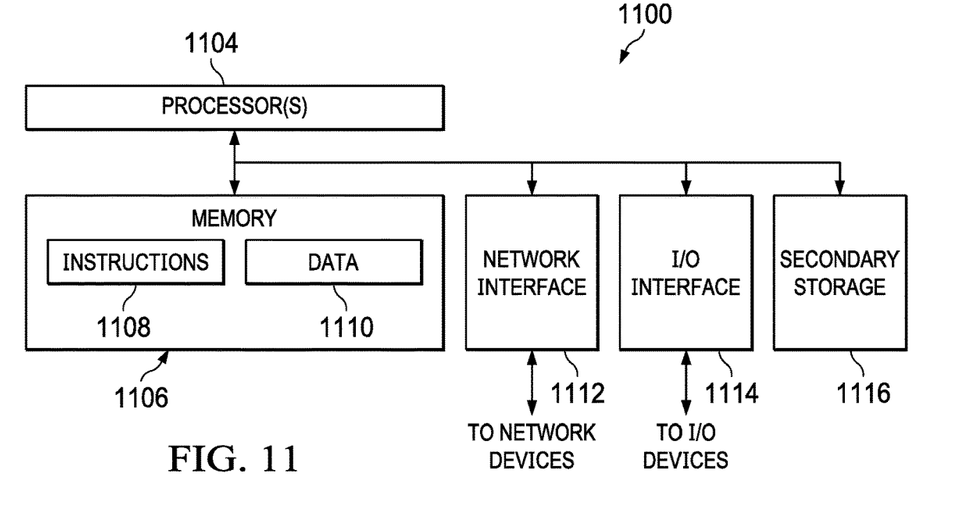
FIG. 11 shows a block diagram for an example computing system suitable for implementation of a calibration computer in accordance with this description.

FIG. 11 shows a block diagram for an example computing system 1100 suitable for implementation of a calibration computer in accordance with this description. The computing system 1100 includes one or more processors 1104 coupled to memory 1106, a network interface 1112, an I/O interface 1114, and secondary storage 116. In various embodiments, a computing node 1102 may be a uniprocessor system including one processor 1104, or a multiprocessor system including several processors 1104 (e.g., two, four, eight, or another suitable number). Processors 1104 may be any suitable processor capable of executing instructions. For example, in various embodiments, processors 1104 may be general-purpose or embedded microprocessors, graphics processing units (GPUs), or digital signal processors (DSPs) implementing any of a variety of instruction set architectures (ISAs). In multiprocessor systems, each of the processors 1104 may commonly, but not necessarily, implement the same ISA.

The memory 1106 may include a non-transitory, computer-readable storage medium configured to store program instructions 1108 and/or data 1110 accessible by processor(s) 1104. The memory 1106 may be implemented using any suitable memory technology, such as static random-access memory (SRAM), synchronous dynamic RAM (SDRAM), nonvolatile/Flash-type memory, or any other type of memory. Program instructions 1108 and data 1110 implementing the functionality disclosed herein are stored within memory 1106. For example, instructions 1108 may include instructions that when executed by processor(s) 1104 implement the operations of blocks 906-916 of the method 900 disclosed herein.

Secondary storage 1116 may include volatile or nonvolatile storage and storage devices for storing information such as the program instructions 1108 and/or the data 1110. The secondary storage 1116 may include various types of computer-readable media accessible by the processors) 1104. A computer-readable medium may include storage media or memory media such as semiconductor storage, magnetic or optical media, e.g., disk or CD/DVD-ROM, or other storage technologies.

The network interface 1112 includes circuitry configured to allow data to be exchanged between the computing node 1102 and/or other devices coupled to a network. For example, the network interface 1112 may be configured to allow data to be exchanged between the computing system 1100 and the in-vehicle computer 812. The network interface 1112 may support communication via wired or wireless data networks.

The I/O interface 1114 allow the processor(s) 1104 to communicate with various input/output devices such as one or more display terminals, keyboards, keypads, touchpads, scanning devices, voice or optical recognition devices, or any other devices suitable for entering or retrieving data by computing system 110. Multiple input/output interfaces 1114 may be present in a computing system 1100.

Those skilled in the art will appreciate that the computing system 1100 is merely illustrative and is not intended to limit the scope of embodiments. In particular, the computing system 1100 may include any combination of hardware or software that can perform the functions disclosed herein. Computing system 1100 may also be connected to other devices that are not illustrated in FIG. 11. In addition, the functionality provided by the illustrated components may in some embodiments be combined in fewer components or distributed in additional components. Similarly, in some embodiments the functionality of some of the illustrated components may not be provided and/or other additional functionality may be available.

Modifications are possible in the described embodiments, and other embodiments are possible, within the scope of the claims.

What is claimed is:

1. A method for multi-sensor calibration, comprising:
   imaging a calibration target with a first sensor using a first modality to obtain a first set of data and with a second sensor using a second modality that is different from the first modality to obtain a second set of data;
   identifying a border of the calibration target based on the first set of data;
   identifying a first centroid location of the calibration target based on the border of the calibration target;
   identifying a border of a pattern disposed on the calibration target based on the second set of data;
   identifying a second centroid location of the calibration target based on the border of the pattern; and
   generating calibration data for the first sensor and the second sensor based on the first centroid location and the second centroid location.

2. The method of claim 1, further comprising:
   imaging the calibration target with a radar sensor; and
   identifying a third centroid location of the calibration target based on a corner reflector disposed on the calibration target.

3. The method of claim 2, wherein generating the calibration data comprises generating the calibration data for a LiDAR sensor, an image sensor, and a radar sensor based on the first centroid location, the second centroid location, and the third centroid location.

4. The method of claim 3, further comprising:
   applying the calibration data to locate an object using one or more of the LiDAR sensor, the image sensor, or the radar sensor; and
   controlling a vehicle based on a location of the object.

5. The method of claim 1, wherein:
   the pattern comprises:
     a border portion of a first color; and
     an inner portion of a second color; and
   the second centroid location is disposed at a specific distance from a corner of the inner portion.

6. The method of claim 5, wherein the pattern comprises a central portion of the first color and disposed at a center of the inner portion.

7. The method of claim 1, wherein a first corner of the pattern and a second corner of the pattern are disposed on a first edge of the calibration target.

8. The method of claim 7, wherein:
   a third corner of the pattern is disposed on a second edge of the calibration target; and
   a fourth corner of the pattern is disposed on a third edge of the calibration target.

9. The method of claim 1, wherein:
   identifying the border of the calibration target based on the first set of data includes identifying the border of a first panel of the calibration target; and
   identifying the first centroid location of the calibration target based on the border of the calibration target includes identifying the first centroid location of the calibration target based on the border of the first panel.

10. The method of claim 9, wherein identifying the second centroid location of the calibration target based on the border of the pattern includes identifying a corner of a second panel of the calibration target.

11. The method of claim 1, further comprising:
generating a first calibration matrix for the first sensor; and
generating a second calibration matrix for the second sensor.

\* \* \* \* \*